(12) United States Patent
Paik et al.

(10) Patent No.: US 12,475,744 B2
(45) Date of Patent: Nov. 18, 2025

(54) METHOD AND APPARATUS FOR PROVIDING HEALTH INDEX OF VEHICLE

(71) Applicants: Hyundai Motor Company, Seoul (KR); Kia Corporation, Seoul (KR)

(72) Inventors: Nam Chung Paik, Goyang-si (KR); Jimin Lee, Seoul (KR); Kimyoung Hong, Seoul (KR); Jaho Koo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 310 days.

(21) Appl. No.: 18/192,336

(22) Filed: Mar. 29, 2023

(65) Prior Publication Data
US 2024/0185650 A1 Jun. 6, 2024

(30) Foreign Application Priority Data
Dec. 6, 2022 (KR) .................. 10-2022-0168951

(51) Int. Cl.
*G07C 5/08* (2006.01)
*G07C 5/00* (2006.01)
(52) U.S. Cl.
CPC .......... *G07C 5/0808* (2013.01); *G07C 5/008* (2013.01); *G07C 5/0841* (2013.01)
(58) Field of Classification Search
CPC .............................. G07C 5/008; G07C 5/0841
USPC .......................................................... 701/1
See application file for complete search history.

(56) References Cited

U.S. PATENT DOCUMENTS

2021/0049836 A1* 2/2021 Covington ............. G07C 5/085
2023/0068432 A1* 3/2023 Upadhyay ............ G07C 5/0808

FOREIGN PATENT DOCUMENTS

CN 105976074 A * 9/2016 ............. G07C 5/008

OTHER PUBLICATIONS

Machine Translation CN105976074 (Year: 2015).*

* cited by examiner

*Primary Examiner* — Navid Z. Mehdizadeh
*Assistant Examiner* — Vincent Feng
(74) *Attorney, Agent, or Firm* — SLATER MATSIL, LLP

(57) ABSTRACT

An embodiment apparatus includes a memory installed in a plurality of modules that provides information for calculating a health index of a vehicle, a control circuit that controls the plurality of modules to perform an operation for determining the health index of the vehicle, and a database that stores connected car information of the vehicle and management information of the vehicle. The plurality of modules includes an information extraction module that extracts driving information and severity factor information from among the connected car information, an influence calculation module that calculates an influence of the driving information, an influence of the severity factor information, and an influence of the management information, and a health index calculation module that calculates a composite health index of the vehicle using the influence of the driving information, the influence of the severity factor information, and the influence of the management information.

19 Claims, 21 Drawing Sheets

FIG. 5

| Driving information | | |
|---|---|---|
| Detailed items | Min | Max |
| Driving ratio for each region | −152 | 162 |
| Driving ratio for each road | −64 | 56 |
| Idling frequency | −26 | 18 |
| Rapid acceleration/deceleration ratio | −38 | 28 |
| Sum | −280 | 264 |

✕ 1.04 (Weight value of driving information)

Driving index

FIG. 6

| Severity factor information | | |
|---|---|---|
| Detailed items | Min | Max |
| High RPM maintenance ratio | -17 | 12 |
| Frequency of engine overload | -19 | 12 |
| Frequency of transmission overload | -33 | 26 |
| Number of engine operations | -36 | 29 |
| Number of transmission operations | -36 | 26 |
| Sum | -141 | 105 |

× 1.03 (Weight value of severity factor information)

Severity index

FIG. 7

| Management information | | |
|---|---|---|
| Detailed items | Min | Max |
| Number of periodic inspections | −29 | 0 |
| Number of airbag deployments | −58 | 0 |
| Sum | −87 | 0 |

✕ 0.99 (Weight value of management information)

| Management index |
|---|

METHOD AND APPARATUS FOR PROVIDING HEALTH INDEX OF VEHICLE

CROSS-REFERENCE TO RELATED APPLICATIONS

This application claims the benefit of Korean Patent Application No. 10-2022-0168951, filed on Dec. 6, 2022, which application is hereby incorporated herein by reference.

TECHNICAL FIELD

The present disclosure relates to a method and apparatus for providing a health index of a vehicle.

BACKGROUND

The residual value of a used car means the transaction price of a used car at a future point in time. In the existing used car market, the used car price is calculated based on the market price which is calculated based on important factors commonly considered such as age, mileage, engine type, and displacement. However, the residual value of the vehicle needs to reflect the health condition of the vehicle, which is evaluated using vehicle data.

Meanwhile, the automobile group is paying attention to data-based mobility services that provide practical benefits by utilizing vehicle data. Through the connected car service, the automobile group opens data such as driving information, mileage, vehicle condition, and driving habits collected with customer consent to the outside and utilizes this vehicle data to provide various mobility services. For example, in the insurance industry, reasonable car insurance services can be provided by utilizing vehicle data.

Accordingly, if it is possible to index the health condition of the vehicle objectively based on vehicle data, it is expected that it can be used for various mobility services as well as used vehicle residual value evaluation.

The information included in this background section is only for enhancement of understanding of the background of embodiments of the invention, and therefore it may contain information that does not form the prior art that is already known to a person of ordinary skill in the art.

SUMMARY

The present disclosure has been made in an effort to provide a method and apparatus for providing a health index of a vehicle capable of providing a health index of the vehicle.

According to one embodiment, an apparatus for providing a health index of a vehicle is provided. The apparatus for providing a health index of a vehicle includes a memory that is installed in a plurality of modules providing information for calculating the health index of the vehicle, a control circuit that controls the plurality of modules to perform an operation for determining the health index of the vehicle, and a database that stores connected car information of the vehicle and management information of the vehicle, wherein the plurality of modules includes an information extraction module that extracts driving information and severity factor information from among the connected car information, an influence calculation module that calculates an influence of the driving information, an influence of the severity factor information, and an influence of the management information, and a health index calculation module that calculates a composite health index of the vehicle using the influence of the driving information, the influence of the severity factor information, and the influence of the management information.

The health index calculation module may provide the composite health index of the vehicle as a grade according to comparison with other vehicles in a group to which the vehicle belongs, and the group may be determined according to at least one of vehicle model, age, trim, and fuel type.

The health index calculation module may calculate a driving index based on the influence of the driving information, may calculate a severity index based on the influence of the severity factor information, may calculate a management index using the influence of the management information, and may calculate the composite health index by combining the driving index, the severity index, and the management index.

The health index calculation module may provide each of the driving index, the severity index, and the management index as a grade according to comparison with other vehicles in a group to which the vehicle belongs, and the group may be determined according to at least one of vehicle model, age, trim, and fuel type.

The influence calculation module may calculate the influence of the driving information by applying a weight of the driving information to a value calculated using the influence of each detailed item of the driving information, may calculate influence of the severity factor information by applying a weight of the severity factor information to a value calculated using the influence of each detailed item of the severity factor information, and may calculate influence of the management information by applying a weight of the management information to a value calculated using the influence of each detailed item of the management information.

The detailed item of the driving information may include at least one of a driving ratio for each region, a driving ratio for each road, an idling frequency, and a rapid acceleration/deceleration ratio.

The detailed item of the severity factor information may include at least one of a high revolution per minute (RPM) maintenance ratio, a frequency of engine overload, a frequency of transmission overload, a number of engine operations, and a number of transmission operations.

The detailed item of the management information may include at least one of a number of periodic inspections and a number of airbag deployments.

The plurality of modules may further include an aging index calculation module that calculates an aging speed index of the vehicle using the composite health index of the vehicle for a set period of time.

The aging index calculation module may provide an aging speed index of the vehicle as a grade according to comparison with other vehicles in a group to which the vehicle belongs.

The aging index calculation module may calculate a moving average value per unit period for each vehicle using the composite health index of each vehicle in the group to which the vehicle belongs during a set period of time, may calculate an aging speed gradient of each vehicle in the group using the moving average value calculated per unit period for each vehicle, and may calculate an aging speed index of the vehicle by comparing the aging speed gradient of the vehicle with the aging speed gradient of other vehicles in the group to which the vehicle belongs.

According to another embodiment, a method for providing a health index of a vehicle by a processor according to a program command stored in a memory is provided. The method for providing a health index of a vehicle includes receiving a health index request of the vehicle from a user terminal, receiving connected car information of the vehicle, receiving management information of the vehicle, calculating an influence of the connected car information and an influence of the management information, calculating a composite health index of the vehicle by using the influence of the connected car information and the influence of the management information, and providing the composite health index of the vehicle to the user terminal.

The calculating the composite health index of the vehicle may include providing the composite health index of the vehicle as a grade according to a comparison with other vehicles in a group to which the vehicle belongs, and the group may be determined according to at least one of vehicle model, age, trim, and fuel type.

The calculating the influence of the connected car information and the influence of the management information may include extracting driving information and severity factor information from the connected car information, calculating an influence of the driving information by applying a weight of the driving information to a value calculated using an influence of each detailed item of the driving information, calculating an influence of the severity factor information by applying a weight of the severity factor information to a value calculated using an influence of each detailed item of the severity factor information, and calculating the influence of the management information by applying a weight of the management information to a value calculated using an influence of each detailed item of the management information.

The calculating the comprehensive health index of the vehicle may include calculating a driving index based on the influence of the driving information, calculating a severity index based on the influence of the severity factor information, calculating a management index using the influence of the management information, and calculating the composite health index by combining the driving index, the severity index, and the management index.

The calculating the comprehensive health index of the vehicle may further include providing each of the driving index, the severity index, and the management index as a grade according to comparison with other vehicles in a group to which the vehicle belongs, and the group may be determined according to at least one of vehicle model, age, trim, and fuel type.

The method for providing a health index of a vehicle may further include calculating an aging speed index of the vehicle using a composite health index of the vehicle for a set period of time and providing the aging speed index of the vehicle to the user terminal.

The calculating the aging speed index of the vehicle may include outputting the aging speed index of the vehicle as a grade according to comparison with other vehicles in a group to which the vehicle belongs.

According to yet another embodiment, a vehicle may be provided. The vehicle includes an apparatus providing a health index of a vehicle. The apparatus providing a health index of a vehicle includes a memory that is installed in a plurality of modules providing information for calculating the health index of the vehicle, a control circuit that controls the plurality of modules to perform an operation for determining the health index of the vehicle, and a database storing connected car information of the vehicle and management information of the vehicle, wherein the plurality of modules includes an information extraction module for extracting driving information and severity factor information from among the connected car information, an influence calculation module for calculating an influence of the driving information, an influence of the severity factor information, and an influence of the management information, and a health index calculation module for calculating a composite health index of the vehicle using the influence of the driving information, the influence of the severity factor information, and the influence of the management information.

According to an embodiment, by indexing the health condition of the vehicle using connected car information and providing the health index of the vehicle, various services using the health index of the vehicle can be provided to users in a fair manner.

According to an embodiment, the health index of the vehicle calculated using the connected car information can be applied to the residual value of the vehicle. Accordingly, the user can put more effort into managing the vehicle, and the level of the user's effort can be reflected in the residual value of the vehicle.

BRIEF DESCRIPTION OF THE DRAWINGS

FIG. 5 is a diagram for explaining an example of a method for calculating the influence of a driving index in the influence calculation module shown in FIG. 2.

FIG. 6 is a diagram for explaining an example of a method of calculating the influence of the severity index in the influence calculation module shown in FIG. 2.

FIG. 7 is a diagram for explaining an example of a method of calculating the influence of a management index in the influence calculation module shown in FIG. 2.

DETAILED DESCRIPTION OF ILLUSTRATIVE EMBODIMENTS

Figure 1:
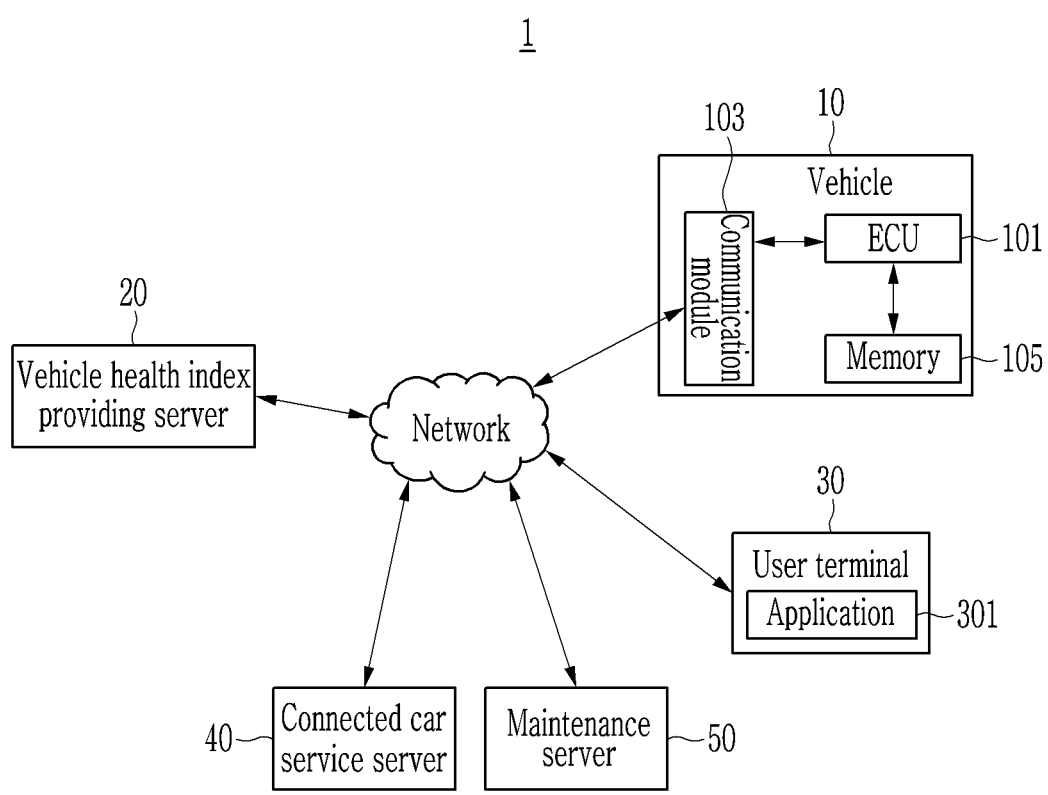
FIG. 1 is a diagram schematically illustrating a system for providing a health index of a vehicle according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is said to "include" a certain element, it means that it may further include other elements rather than exclude other elements, unless specifically indicated otherwise.

In addition, throughout the specification and claims, the suffixes "module," "unit," and/or "group" for components are assigned or used interchangeably in consideration of only the ease of writing the specification and do not have meanings or roles that are distinguished from each other by themselves.

Throughout the specification and claims, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may be referred to as a first element.

Throughout the specification and claims, when an element is referred to as being "connected" to another element, it should be understood that it may be directly connected to the other element, but other elements in the middle between the element and another element may exist. On the other hand, when an element is referred to as "directly connected" to another element, it should be understood that no other element exists in the middle.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Also, in this specification, terms such as "unit," "group," and "module" refer to a unit that processes at least one function or operation and may be implemented as hardware or software or a combination of hardware and software.

Now, a method and apparatus for providing a health index of a vehicle according to embodiments of the present disclosure will be described in detail with reference to the drawings.

The residual value modeling of the vehicle is calculated as the sum of two parts: the standard market price and the influence of connected car data. The standard market price refers to the market price set for vehicles in the market.

The connected car data influence refers to the influence on the residual value of the vehicle by utilizing the vehicle data held by the connected car service server.

The health index of the vehicle according to an embodiment of the present disclosure may use only the influence of connected car data, excluding the part of the standard market price in the residual value modeling of the vehicle.

FIG. 1 is a diagram schematically illustrating a system for providing a health index of a vehicle according to an embodiment.

Referring to FIG. 1, the system 1 for providing a health index of a vehicle includes a vehicle 10, a vehicle health index providing server 20, a user terminal 30, a connected car service server 40, and a maintenance server 50.

The vehicle 10, the vehicle health index providing server 20, the user terminal 30, the connected car service server 40, and the maintenance server 50 are connected to each other through a network 60.

The network 60 may include a personal area network (PAN), a local area network (LAN), a campus area network (CAN), a metropolitan area network (MAN), a wide area network (WAN), a broadband network (BBN), a wireless LAN (WLAN), a storage area network (SAN), or a controller area network (CAN), or may be a cellular communication such as a long term evolution (LTE), an LTE advanced (LTE-A), a code-division multiple access (CDMA), a wideband code division multiplex access (WCDMA), a universal mobile telecommunication system (UMTS), a wireless broadband (WiBro), or a global system for mobile communications (GSM), and is not limited thereto.

The vehicle 10 may include an electronic control unit (ECU) 101, a communication module 103, and a memory 105.

The memory 105 may store connected car information.

A connected car refers to a vehicle capable of providing various services by being connected to the network 60.

The connected car information of the vehicle 10 may be transmitted to the connected car service server 40 through the communication module 103.

The connected car information may be information on the connected car, and can be categorized into basic information, product information, driving information, severity factor information, and management information. The connected car information may have different categories and detailed items in the categories, based on a power source of the vehicle 10, which is classified as an internal combustion engine or an electricity engine.

The basic information may include information about the vehicle class, vehicle model, mileage, age, fuel type, engine displacement, and brand of the vehicle 10 as detailed items.

The product information may include, as detailed items, information about an exterior color of the vehicle 10 and a mounting option such as a panoramic sunroof.

The driving information may include, as detailed items, information about the driving ratio for each region of the vehicle 10, the driving ratio for each road of the vehicle 10, the idling frequency, and the rapid acceleration/deceleration ratio.

The severity factor information may include, as detailed items, information on the high revolution per minute (RPM) maintenance ratio of the vehicle 10, the frequency of engine overload, the frequency of transmission overload, the number of engine operations, and the number of transmission operations.

The management information may include, as detailed items, the number of periodic inspections of the vehicle 10 and the number of airbag deployments.

The ECU 101 may generate information about the driving ratio for each region, the driving ratio for each road, the rapid acceleration/deceleration ratio, the frequency of the high RPM maintenance, the frequency of engine overload, the frequency of transmission overload, the number of engine operations, the number of transmission operations, etc. from driving data of the vehicle 10. When receiving a request for connected car information from the vehicle health index providing server 20, the ECU 101 may transmit information stored in the memory 105 to the vehicle health index providing server 20 through the communication module 103.

The communication module 103 may transmit a control command of the ECU 101 to the outside through the network 60 and transmit information received from the outside to the ECU 101.

Also, the memory 105 may store information generated by the ECU 101.

When receiving a basic information search request from the user terminal 30, the vehicle health index providing server 20 provides basic information of the vehicle 10 and product information to the user terminal 30.

When receiving a detailed information request from the user terminal 30, the vehicle health index providing server 20 requests the connected car service server 40 for connected car information of the vehicle 10 corresponding to the health index request and may receive the connected car information of the vehicle 10. Next, the vehicle health index providing server 20 calculates the health index of the vehicle 10 based on driving information, severity factor information, and management information among the connected car information of the vehicle 10, and provides the health index of the vehicle 10 to the user terminal 30. The detailed information request may refer to a health index request of the vehicle 10.

The user terminal 30 may be a terminal of an owner of the vehicle 10 subscribed to a service provided by the vehicle health index providing server 20. The user terminal 30 may transmit the health index request of the vehicle 10 to the vehicle health index providing server 20 and receive the health index of the vehicle 10 from the vehicle health index providing server 20.

An application 301 capable of requesting a health index of the vehicle 10 and displaying the health index of the vehicle 10 may be installed in the user terminal 30.

The user terminal 30 may be a terminal of a user who intends to purchase the vehicle 10. When the owner of the vehicle 10 agrees to provide information about the vehicle 10, such as the health index of the vehicle 10, to a third party, the user terminal 30 of the user who intends to purchase the vehicle 10 may request a health index of the vehicle 10.

The connected car service server 40 provides connected car service information to the vehicle 10. The connected car service server 40 may receive and store connected car information from the vehicle 10 and store connected car information. The connected car service server 40 may transmit connected car information of the vehicle 10 to the vehicle health index providing server 20 through the network 60 upon request from the vehicle health index providing server 20.

The maintenance server 50 may store management information including the number of periodic inspections of the vehicle 10, general/insurance repair costs, warranty repair/pre-inspection costs, number of airbag deployments, and information on accident portions. The maintenance server 50 may transmit management information of the vehicle 10 to the vehicle health index providing server 20 through the network 60 upon request from the vehicle health index providing server 20.

Figure 2:
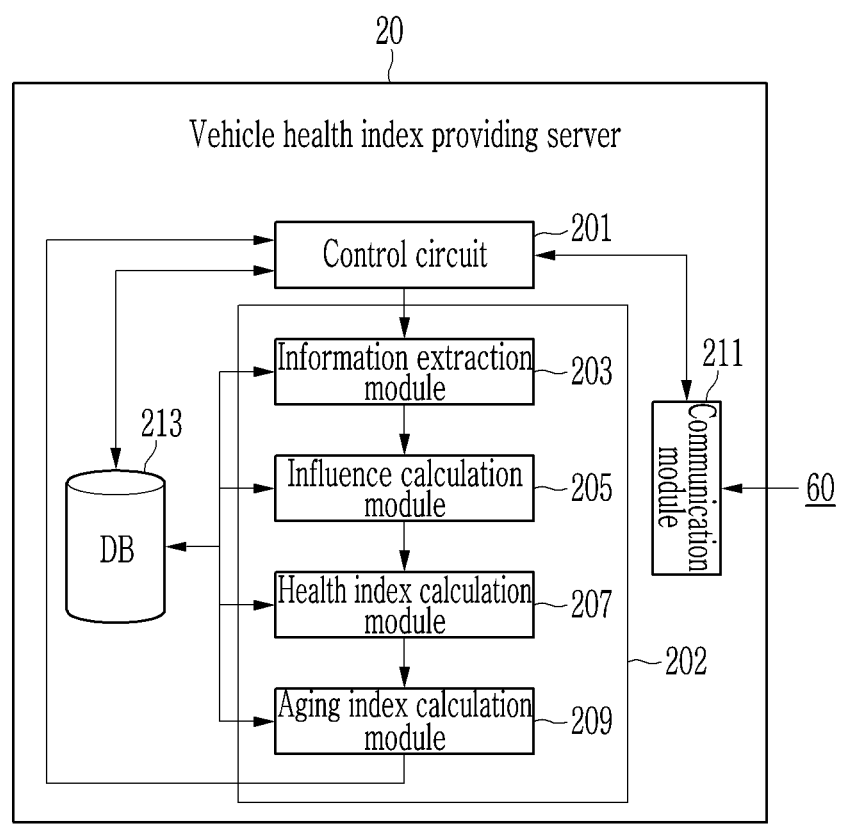
FIG. 2 is a diagram illustrating a vehicle health index providing server shown in FIG. 1.
Figure 3:
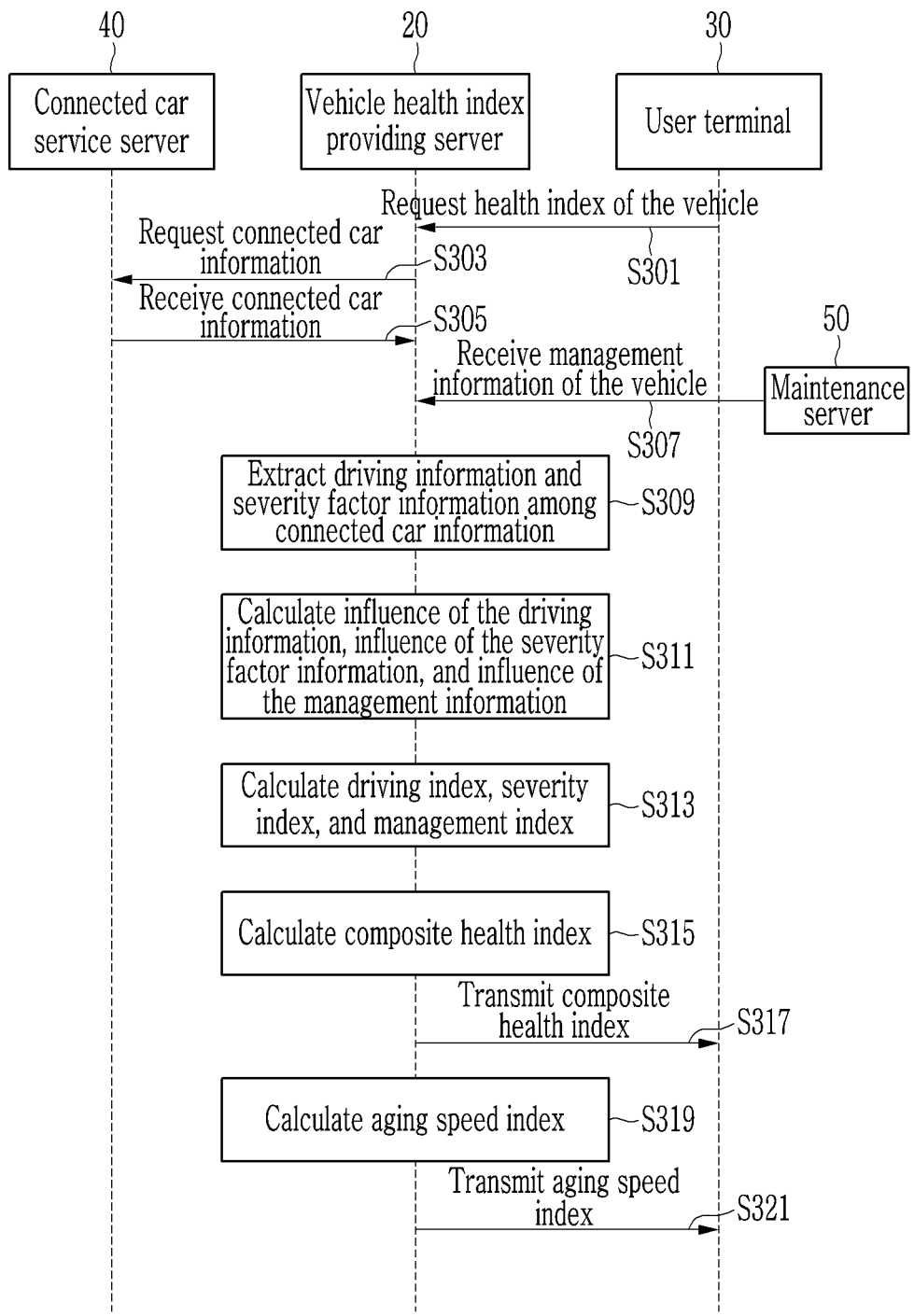
FIG. 3 is a flowchart illustrating a method for providing a health index of a vehicle in the vehicle health index providing server shown in FIG. 2.

FIG. 2 is a diagram illustrating a vehicle health index providing server shown in FIG. 1, and FIG. 3 is a flowchart illustrating a method for providing a health index of a vehicle in the vehicle health index providing server shown in FIG. 2.

Referring to FIG. 2, the vehicle health index providing server 20 includes a control circuit 201, an information extraction module 203, an influence calculation module 205, a health index calculation module 207, an aging index calculation module 209, a communication module 211, and a database 213.

The information extraction module 203, the influence calculation module 205, the health index calculation module 207, and the aging index calculation module 209 may be installed on a memory 202.

The control circuit 201 may perform an operation for determining the health index of the vehicle by controlling the information extraction module 203, the influence calculation module 205, the health index calculation module 207, and the aging index calculation module 209.

Referring to FIGS. 2 and 3, the user terminal 30 requests the health index of the vehicle 10 from the vehicle health index providing server 20 through the application 301 (S301).

When the control circuit 201 receives a health index request of the vehicle 10 from the user terminal 30 through the communication module 211, the control circuit 201 may operate the information extraction module 203, the influence calculation module 205, and the health index calculation module 207 and the aging index calculation module 209.

When the control circuit 201 receives the request for health index of the vehicle 10 from the user terminal 30 through the communication module 211, the control circuit 201 collects connected car information of the vehicle 10. The control circuit 201 may request the connected car information of the vehicle 10 from the connected car service server 40 (S303) and receive the connected car information of the vehicle 10 from the connected car service server 40 (S305).

Also, the control circuit 201 may request management information of the vehicle 10 from the maintenance server 50 and receive management information of the vehicle 10 from the maintenance server 50 (S307).

The control circuit 201 may store management information of the vehicle 10 received from the maintenance server 50 and connected car information of the vehicle 10 received from the connected car service server 40 in the database 213.

In addition, the control circuit 201 may infer connected car information for a predetermined period of not having connected car information of the vehicle 10 based on the connected car information of the vehicle 10 stored in the database 213, if necessary.

The database 213 divides storage areas for each of a plurality of vehicles, and each storage area for each vehicle may include fields for management information and connected car information, respectively. The control circuit 201 may store the received management information and connected car information in a corresponding field.

The information extraction module 203 extracts management information of the vehicle 10 from the database 213 and extracts driving information and severity factor information from among connected car information of the vehicle 10 (S309). The management information of the vehicle 10, driving information of the vehicle 10, and severity factor information may be transmitted to the influence calculation module 205.

The influence calculation module 205 calculates the influence of the driving information using detailed item information of the driving information of the vehicle 10, calculates the influence of the severity factor information using the detailed item information of the severity factor information of the vehicle 10, and calculates the influence of the management information using detailed item information of the management information of the vehicle 10 (S311).

Influence means a coefficient calculated using a weighted average or curve estimation method. The influence may have influence for each detailed item within the category and may be used to calculate the influence value of the category by adding the corresponding influences for each detailed item to each other or applying the influence as a coefficient to an equation. The influence value of a category may be a value calculated by multiplying a value calculated using the influence of each detailed item within a category by a weight of the corresponding category. The weight refers to the contribution of each category to the health index of the vehicle 10. The weight may be determined through vehicle experts and market research.

The health index calculation module 207 calculates the driving index of the vehicle 10 by using the influence of the driving information of the vehicle 10, calculates the severity index of the vehicle 10 by using the influence of the severity factor information of the vehicle 10, and calculates the management index of the vehicle 10 using the influence of the management information of the vehicle 10 (S313). The process of calculating the index of the corresponding category using the influence of each category may include a process of converting the unit of influence of each category information into a unit of the index.

The health index calculation module 207 calculates a composite health index of the vehicle 10 by combining the driving index of the vehicle 10, the severity index of the vehicle 10, and the management index of the vehicle 10 (S315). The health index calculation module 207 may calculate a composite health index of the vehicle 10 by summing the driving index of the vehicle 10, the severity index of the vehicle 10, and the management index of the vehicle 10.

Upon receiving the composite health index of the vehicle 10 from the health index calculation module 207, the control circuit 201 may transmit it to the user terminal 30 through the communication module 211 (S317).

The aging index calculation module 209 calculates the aging speed index of the vehicle 10 using the composite health index of the vehicle 10 (S319).

When receiving the aging speed index of the vehicle 10 from the aging index calculation module 209, the control circuit 201 may transmit it to the user terminal 30 through the communication module 211 (S321).

The information of the vehicle 10 calculated by the influence calculation module 205, the health index calculation module 207, and the aging index calculation module 209, weights for each category, influence calculation formula, and the like may be stored in the database 213.

Figure 4:
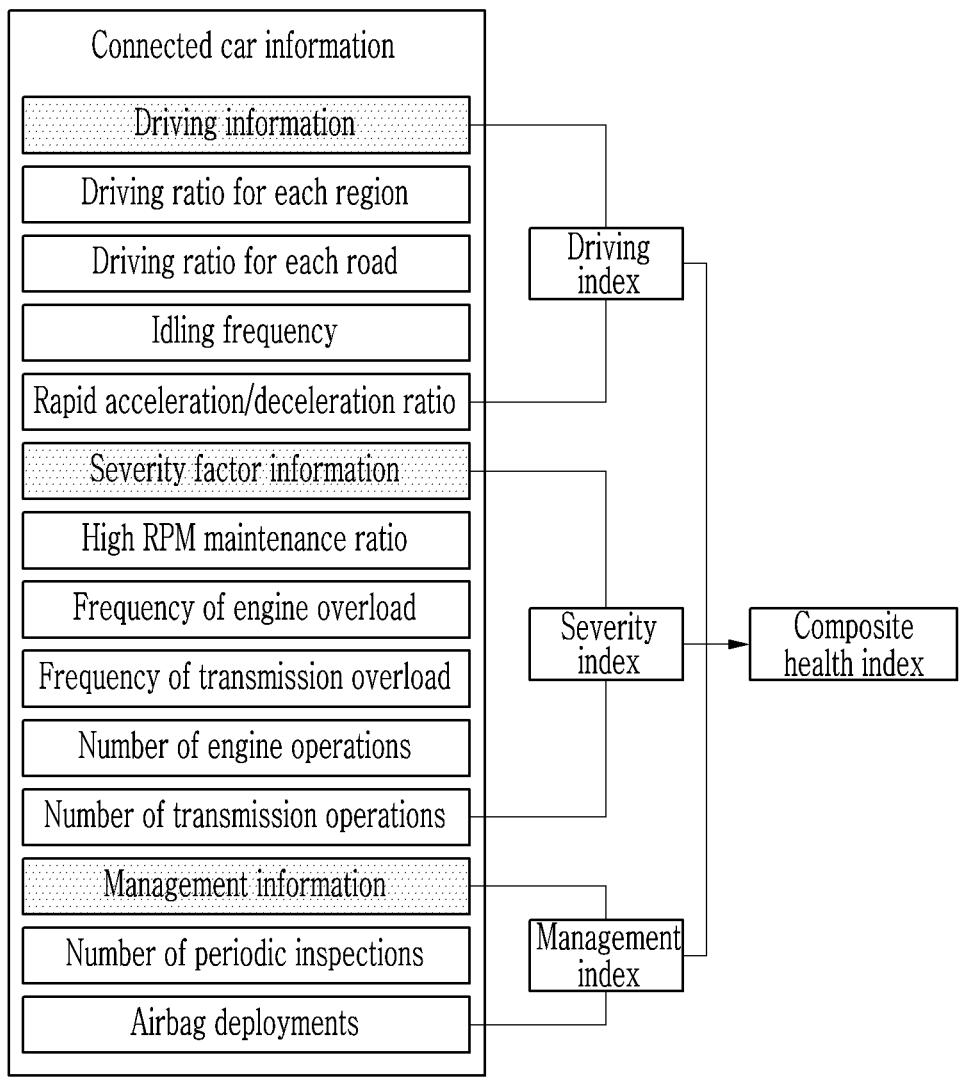
FIG. 4 is a diagram conceptually illustrating a method for calculating a composite health index in the vehicle health index providing server shown in FIG. 2.

FIG. 4 is a diagram conceptually illustrating a method for calculating a composite health index in the vehicle health index providing server shown in FIG. 2.

Referring to FIG. 4, the driving information affecting the health index of the vehicle 10 may include the driving ratio for each region, the driving ratio for each road, the idling frequency, the rapid acceleration/deceleration ratio, and the like.

The driving ratio for each region may be a driving ratio in a city, a mountainous area, or a coastal area. The driving ratio for each region may be calculated using driving data of the vehicle.

The driving ratio for each road may be a driving ratio of a highway, a national road, or a city road. The driving ratio of the city road may be the driving ratio of roads other than highways and national roads. The driving ratio for each road may be calculated using driving data of the vehicle.

The idle frequency may be an idle quartile. That is, the idling frequency can be expressed using quantile data, which is a comparison value with other vehicles in the same group. The number of times when the speed is 0 and the engine RPM is greater than 0 is calculated, and the idling percent (%) can be calculated from the calculated number of times.

The rapid acceleration/deceleration ratio may be a quartile of the number of times the reference acceleration is exceeded. That is, the rapid acceleration/deceleration ratio may also be expressed using quantile data, which is a comparison value with other vehicles in the same group. The reference acceleration may be determined through a reference acceleration distribution.

A quantile (%) representing a rapid acceleration/deceleration ratio may be calculated after calculating the number of times that the reference acceleration is exceeded for each bin (vin) and sorting the number of times that the reference acceleration is exceeded for all bins (vehicles).

The severity factor information affecting the vehicle health index may include a high RPM maintenance ratio, the frequency of engine overload, the frequency of transmission overload, the number of engine operations, and the number of transmission operations. The frequency of engine overload, the frequency of transmission overload, the number of engine operations, and the number of transmission operations can also be expressed using quantile data, which is a comparison value with other vehicles in the same group.

The high RPM maintenance ratio may be a quantile of the number of times the reference RPM is exceeded. The reference RPM may be determined through engine RPM distribution. After calculating the number of times that the reference RPM is exceeded for each bin and sorting the number of times that the reference RPM is exceeded for all bins, a quantile (%) indicating a high RPM maintenance rate may be calculated.

The frequency of engine overload may be a quartile for the number of times a reference torque is exceeded. The reference torque may be determined through engine torque distribution. After calculating the number of times the reference torque exceeds the reference torque for each bin and sorting the number of times the reference torque exceeds the number of all bins, a quantile representing the engine overload frequency may be calculated.

The frequency of transmission overload may be a quartile for the number of times the engine power exceeds the reference power. The engine power can be calculated based on engine torque and RPM signals. The reference power may be determined through engine power distribution. After calculating the number of times the engine power exceeds the reference power for each bin and sorting the number of times the reference power exceeds the reference power for all bins, a quantile representing the frequency of transmission overload may be calculated.

The number of engine operations may be a quartile of the number of engine starts/accelerations. After sorting the number of engine starts, the quantile of the number of engine operations can be calculated.

The number of transmission operations may be a quantile of the number of transmission shifts. A case in which the current gear stage is different from the gear stage after a set time (e.g., 1 second) may be defined as shifting. After calculating the number of shifts for each bin and sorting the number of shifts in all bins, a quantile of the number of shifts may be calculated.

The management information affecting the vehicle health index may include the number of periodic inspections, airbag deployments, and the like.

The number of periodic inspections may be expressed by converting the number of periodic inspections per year into binary form.

The airbag deployment histories may be represented by converting the number of airbag deployments into binary form.

The vehicle health index providing server 20 calculates a driving index using the driving information of the vehicle 10 described above and calculates a severity index using the severity factor information of the vehicle 10 described above. In addition, the vehicle health index providing server 20 calculates the management index using the management information of the vehicle 10 described above.

As described above, the driving index may be calculated based on the influence of driving information. The severity index may be calculated based on the influence of severity factor information. The management index may be calculated based on the influence of management information. A method of calculating the influence of each category will be described in detail with reference to FIGS. 5 to 7.

The vehicle health index providing server 20 calculates a composite health index of the vehicle 10 using the driving index of the vehicle 10, the severity index of the vehicle 10, and the management index of the vehicle 10.

FIG. 5 is a diagram for explaining an example of a method for calculating the influence of a driving index in the influence calculation module shown in FIG. 2.

Referring to FIG. 5, the influence of each detailed item of the driving information of the vehicle 10 within the group to which the vehicle 10 belongs may be defined as a value representing the relative position occupied by each detailed item of the vehicle 10 within the influence range determined for each detailed item.

The unit of the range of influence for each detailed item may be won or may have a different unit. The detailed items of driving information may include the driving ratio for each region, the driving ratio for each road, the idling frequency, and the rapid acceleration/deceleration ratio.

The influence calculation module 205 sets an influence range for each detailed item of driving information. The influence range can be determined from the minimum influence (min) and the maximum influence (max).

Next, the influence calculation module 205 calculates the influence for each detailed item of driving information.

For example, it is assumed that the driving ratio for each region of the vehicle 10 is 160, and the minimum influence (Min) and maximum influence (Max) of the driving ratio for each region are set to −152 and 162, respectively. The influence calculation module 205 may calculate the relative position occupied by 160, which is the driving ratio for each region of the vehicle 10, in the range between −152 and 162 as the influence of the driving ratio for each region of the vehicle 10.

Also, it is assumed that the driving ratio for each road of the vehicle 10 is 30 and the minimum influence (Min) and the maximum influence (Max) of the driving ratio for each road are set to −64 and 56, respectively. The influence calculation module 205 may calculate a relative position occupied by 30, which is the driving ratio for each road of the vehicle 10, in the range between −64 and 56 as the influence of the driving ratio for each road of the vehicle 10.

The influence calculation module 205 may calculate the influence of the idle frequency and the influence of the rapid acceleration/deceleration ratio in a similar manner.

Next, the influence calculation module 205 calculates the influence of each detail of the driving information, sums up all the influences of each detail of the driving information, and applies a weighted value of the driving information to the summed value. The influence calculation module 205 may calculate a value obtained by applying the weight value of the driving information to the summed value as the influence of the driving information. In FIG. 5, the weight value of the driving information is shown as 1.04.

Meanwhile, the influence calculation module 205 may set the influence range of the entire driving information by using the influence range for each detailed item of the driving information. For example, in FIG. 5, the influence calculation module 205 sums all values of minimum influence (min) for each detailed item of driving information and may set the summed value as the minimum influence of the entire driving information. The influence calculation module 205 sums all values of maximum influence (max) for each detailed item of driving information and may set the summed value as the maximum influence of the entire driving information.

Next, the influence calculation module 205 sums all values of detailed items of driving information of the vehicle 10 and applies a weighted value of the driving information to the summed value. The influence calculation module 205 may calculate a relative position occupied by a value obtained by applying the weight value of the driving information to the summed value, in a range of minimum influence and maximum influence of the entire driving information as the influence of the driving information of the vehicle 10.

The health index calculation module 207 may calculate the driving index by using the influence of the driving information.

When the unit of the influence range for each detailed item is won, the unit of the driving index calculated by the health index calculation module 207 is also won. Accordingly, the health index calculation module 207 may convert the unit of the calculated driving index. For example, the health index calculation module 207 may convert the unit of the index unit into a grade.

FIG. 6 is a diagram for explaining an example of a method of calculating the influence of the severity index in the influence calculation module shown in FIG. 2.

Referring to FIG. 6, the influence of each detailed item of the severity factor information of the vehicle 10 within the group to which the vehicle 10 belongs may be defined as a value representing the relative position occupied by each detailed item of the vehicle 10 within the influence range determined for each detailed item.

The unit of the range of influence for each detailed item may be won or may have a different unit. The detailed items of the severity factor information may include the high RPM maintenance ratio, the frequency of engine overload, the frequency of transmission overload, the number of engine operations, and the number of transmission operations.

The influence calculation module 205 sets an influence range for each detailed item of the severity factor information. The influence range can be determined from the minimum influence (min) and the maximum influence (max).

Next, the influence calculation module 205 calculates the influence of each detailed item of the severity factor information.

For example, it is assumed that the high RPM maintenance ratio of the vehicle is 10, and the minimum influence (Min) and the maximum influence (Max) of the high RPM maintenance ratio are set to −17 and 12, respectively. The influence calculation module 205 may calculate the relative position occupied by the vehicle 10, which is the high RPM maintenance ratio of the vehicle 10, as the influence of the high RPM maintenance ratio of the vehicle 10 in the range between −17 and 12.

The influence calculation module 205 may calculate the influence of the frequency of engine overload, the influence of the frequency of transmission overload, the influence of the number of engine operations, and the influence of the number of transmission operations of the vehicle 10 in a similar manner.

Next, the influence calculation module 205 may calculate the influence of the severity factor information by summing up all the influences of each detailed item of the severe factor information and then applying a weight value of the severe factor information to the summed value. In FIG. 6, it is illustrated that the weight value of the severity factor information is 1.03.

Meanwhile, the influence calculation module 205 may set the influence range of the entire severity factor information by using the influence range for each detailed item of the severity factor information. For example, in FIG. 6, the influence calculation module 205 sums all values of minimum influence (min) for each detailed item of severity factor information and may set the summed value as the minimum influence of the entire severity factor information. The influence calculation module 205 sums all values of maximum influence (max) for each detailed item of severity factor information and may set the summed value as the maximum influence of the entire severity factor information.

Next, the influence calculation module 205 sums all the values of the detailed items of the severity factor information of the vehicle 10 and applies a weight value of the severity factor information to the summed value. The influence calculation module 205 may calculate a relative position occupied by a value obtained by applying the weight value of the severity factor information to the summed value, within a range of minimum influence and maximum influence of the entire severity factor information as the influence of the severity factor information of the vehicle 10.

The health index calculation module 207 may calculate the severity index using the influence of the severity factor information.

Similarly, when the unit of the influence range for each detailed item is won, the unit of the driving index calculated by the health index calculation module 207 is also won. The health index calculation module 207 may convert the unit of the calculated severity index. For example, the health index calculation module 207 may convert the unit of the index into a grade.

FIG. 7 is a diagram for explaining an example of a method of calculating the influence of a management index in the influence calculation module shown in FIG. 2.

Referring to FIG. 7, the influence of each detailed item of management information within the group to which the vehicle 10 belongs may be defined as a value representing the relative position occupied by the detailed item of the vehicle 10 within the influence range determined for each detailed item.

The unit of the range of influence for each detailed item may be won or may have a different unit. The detailed items of the management information may include the number of periodic inspections and the number of airbag deployments.

The influence calculation module 205 sets an influence range for each detailed item of management information. The influence range can be determined from the minimum influence (min) and the maximum influence (max).

Next, the influence calculation module 205 calculates the influence of each detailed item of management information.

For example, it is assumed that the number of periodic inspections of the vehicle 10 is 2, and the minimum influence (Min) and the maximum influence (Max) of the number of periodic inspections are set to −29 and 0, respectively. The influence calculation module 205 may calculate a relative position occupied by 2, which is the number of periodic inspections of the vehicle 10, in the range between −29 and 0 as the influence of the number of periodic inspections of the vehicle 10.

The influence calculation module 205 may calculate the influence of the number of airbag deployments of the vehicle 10 in a similar way.

Next, the influence calculation module 205 may calculate the influence of the severity factor information by summing up the influence of each detailed item of the management information and then applying a weight value of the management information to the summed value. In FIG. 7, the weight value of the management information is shown as 0.99.

Meanwhile, the influence calculation module 205 may set the influence range of the entire management information by using the influence range for each detailed item of the management information. For example, in FIG. 7, the influence calculation module 205 sums all values of minimum influence (min) for each detailed item of management information and may set the summed value as the minimum influence of the entire management information. The influence calculation module 205 sums all values of maximum influence (max) for each detailed item of management information and may set the summed value as the maximum influence of the entire management information.

Next, the influence calculation module 205 sums all values of the detailed items of management information of the vehicle 10 and applies a weight value of the management information to the summed values. The influence calculation module 205 may calculate a relative position occupied by a value obtained by applying the weight value of the management information to the summed value, within a range of minimum influence and maximum influence of the entire management information as the influence of the management information of the vehicle 10.

The health index calculation module 207 may calculate a management index using the influence of management information.

Similarly, when the unit of the influence range for each detailed item is won, the unit of the management index calculated by the health index calculation module 207 is also won. The health index calculation module 207 may convert the unit of the calculated management index. For example, the health index calculation module 207 may convert the unit of the index into a grade.

Figure 8:
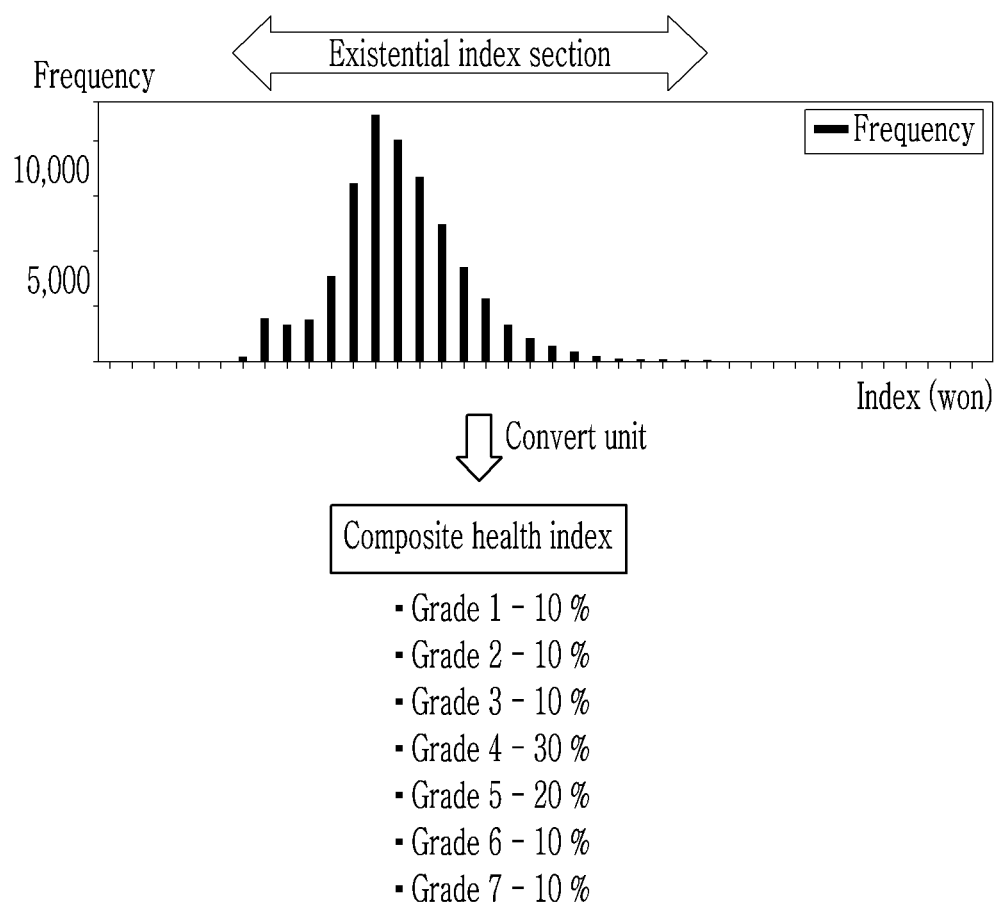
FIG. 8 is a diagram for explaining an example of a method for deriving a composite health index in the health index calculation module shown in FIG. 2.
Figure 9:
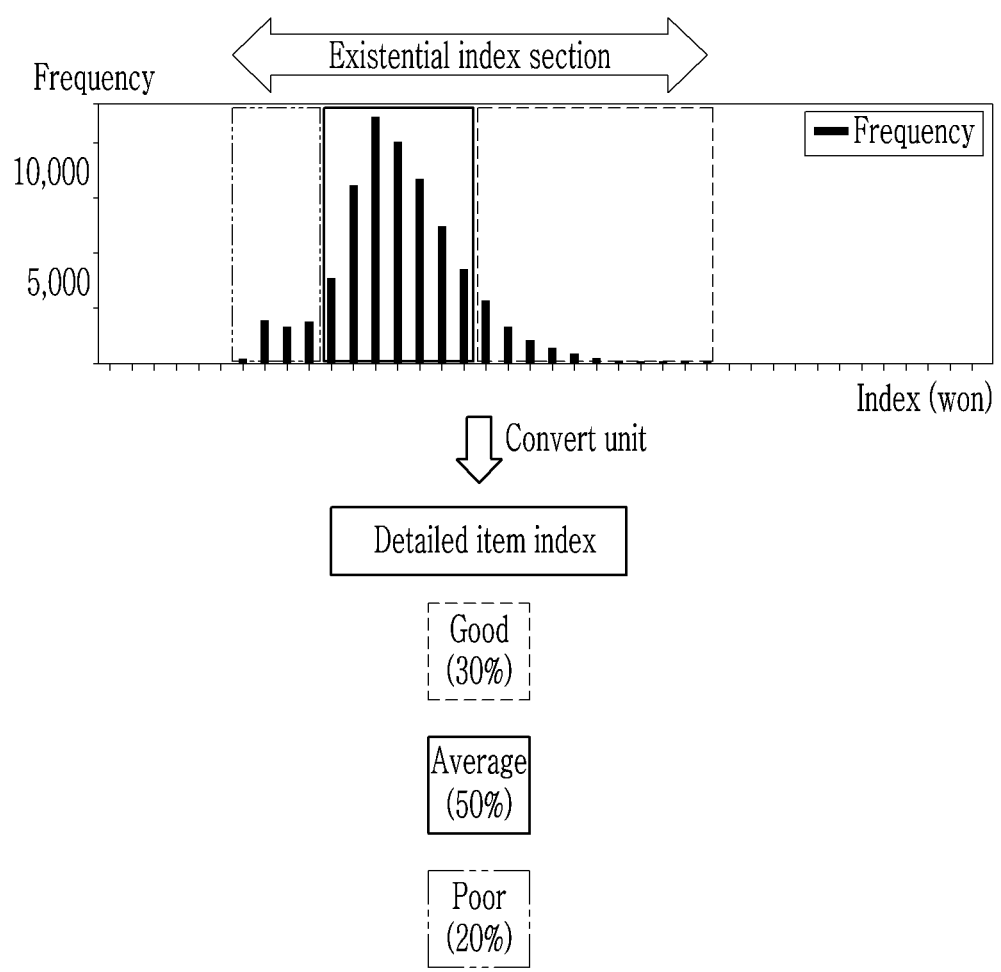
FIG. 9 is a diagram for explaining an example of a method for deriving detailed item indices in the health index calculation module shown in FIG. 2.

FIG. 8 is a diagram for explaining an example of a method for deriving a composite health index in the health index calculation module shown in FIG. 2, and FIG. 9 is a diagram for explaining an example of a method for deriving detailed item indices in the health index calculation module shown in FIG. 2.

Referring to FIG. 8, the health index calculation module 207 may arrange composite health indices of vehicles in the same group. The health index calculation module 207 may visualize the composite health indices of vehicles in the same group as a graph. In the graph, the x-axis may represent the composite health index (won), and the y-axis may represent the frequency (number of vehicles).

The groups can be classified according to vehicle model, age, trim, and fuel type. Vehicles having the same model, same age, same trim, and same fuel type may be classified as one group.

The health index calculation module 207 may divide the x-axis section between the lowest index and the maximum index into a plurality of sections according to a predetermined ratio and assign a grade to each section. In FIG. 8, it is shown that the x-axis existential index section with index values is divided into 7 sections such that the ratios from grade 1 to grade 7 are 10%, 10%, 10%, 30%, 20%, 10%, and 10%, respectively. In this way, when the existential index section is divided into 7 sections, grades 1 to 7 may be assigned to each of the 7 sections.

The grades may be divided between the highest grade and the lowest grade by a set number of grades. If the set number of the grades is too small or if the composite health index of vehicles is excessively concentrated in a specific grade, discrimination for differentiating vehicle health conditions may be low. On the other hand, if the grades are too detailed, logic backtracking concerns may arise. Accordingly, the health index calculation module 207 may determine the number of grades in consideration of discrimination and logic backtracking concerns.

The health index calculation module 207 may output a grade assigned to a section to which the composite health index of the vehicle 10 belongs as the composite health index of the vehicle 10.

In the same way, the health index calculation module 207 may output the driving index of the vehicle 10, the severity index of the vehicle 10, and the management index of the vehicle 10, which are detailed items associated in the composite health index of the vehicle 10, as grades, respectively.

Referring to FIG. 9, the health index calculation module 207 may arrange detailed item indices of vehicles in the same group. The health index calculation module 207 may visualize detailed item indices of vehicles in the same group as a graph. In the graph, the x-axis may represent the detailed item index (won), and the y-axis may represent the frequency (number of vehicles). Here, the detailed item index may be one of a driving index, a severity index, and a management index.

The health index calculation module 207 may divide the x-axis section between the lowest index and the maximum index into a plurality of sections according to a predetermined ratio and assign a grade to each section. The x-axis section representing the detailed item index may be divided into fewer sections than the composite health index. In FIG. 9, it is shown that the existential index section of the x-axis where the index values exist is divided into three sections such that the ratios from grade 1 to grade 3 are 30%, 50%, and 20%, respectively. In this way, when the existential index section is divided into three sections, the three sections may be assigned grades representing good, average, and poor, respectively.

The health index calculation module 207 may output a grade assigned to a section to which the detailed item index of the vehicle 10 belongs as the detailed item index of the vehicle 10.

The composite health index of the vehicle 10 continuously decreases as the vehicle is used. When the subsequent owner takes over the vehicle 10, the grade is already determined according to the health condition (state) of the vehicle 10. However, as the calculation of the composite health index of the vehicle 10 becomes possible, through the composite health index of the vehicle 10, it can be confirmed that the health condition of the vehicle 10 is well managed by the efforts of the subsequent owner. Health condition management of the vehicle 10 can also be confirmed through the aging speed of the vehicle 10.

Figure 10:
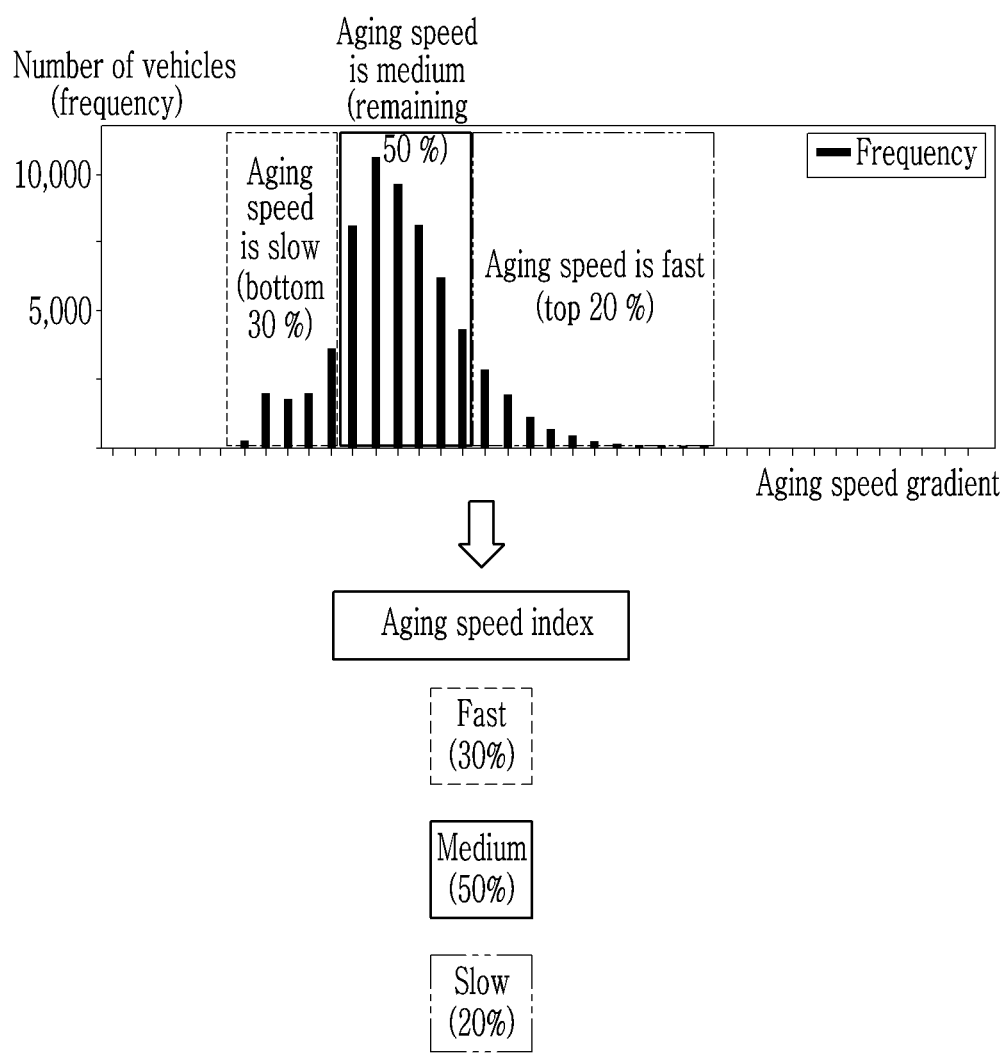
FIG. 10 is a diagram for explaining an example of a method for calculating an aging speed index of a vehicle in the aging index calculation module shown in FIG. 2.
Figure 11:
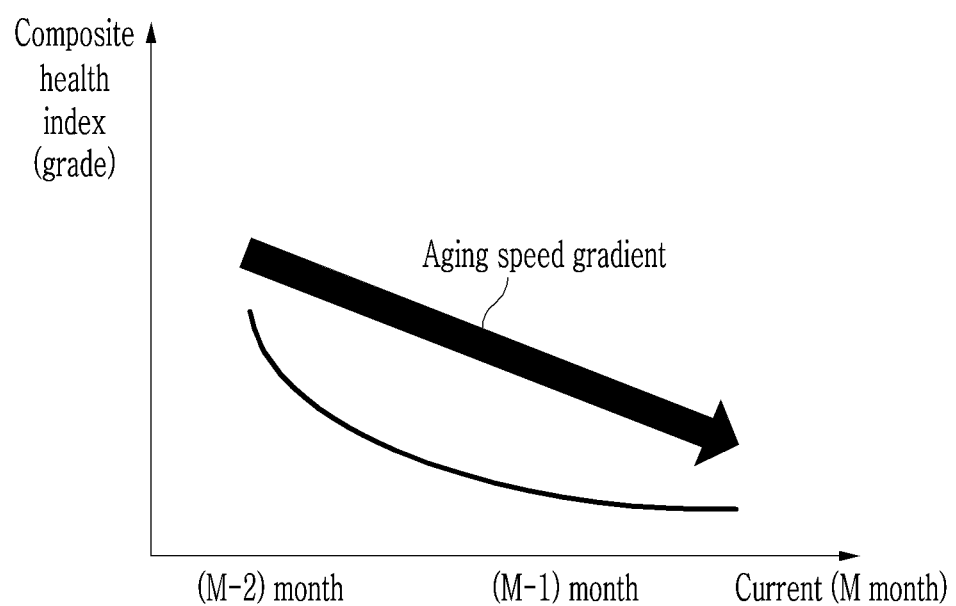
FIG. 11 is a diagram illustrating an example of a method for calculating an aging speed gradient of a vehicle.

FIG. 10 is a diagram for explaining an example of a method for calculating an aging speed index of a vehicle in the aging index calculation module shown in FIG. 2, and FIG. 11 is a diagram illustrating an example of a method for calculating an aging speed gradient of a vehicle.

The aging index calculation module 209 may calculate the aging speed index of the vehicle 10 based on the composite health index of the vehicle 10.

As shown in FIG. 11, the aging index calculation module 209 calculates a moving average value for each unit period for each vehicle in the group based on the composite health index of the vehicles in the group to which the vehicle 10 belongs for a recently set period of time (e.g., the last 3 months). The aging index calculation module 209 calculates the aging speed gradient of each vehicle in the group using the moving average value calculated for each unit period for each vehicle.

The aging index calculation module 209 may arrange the aging speed gradients of the vehicles in the group. As shown in FIG. 10, the aging index calculation module 209 may visualize the aging speed gradients of vehicles in the group as a graph. In the graph, the x-axis may represent an aging speed gradient, and the y-axis may represent a composite health index.

The aging index calculation module 209 may divide the x-axis section between the lowest aging speed gradient and the maximum aging speed gradient into a plurality of sections according to a predetermined ratio and assign a grade to each section. In FIG. 10, it is shown that the x-axis existential gradient section in which the gradient value exists is divided into three sections such that the ratios from grade 1 to grade 3 are 30%, 50%, and 20%, respectively. In this way, when the existential gradient section is divided into three sections, each of the three sections may be assigned grades indicating fast, medium, and slow, indicating an aging speed index.

The aging index calculation module 209 may output, as the aging speed index of the vehicle 10, a grade assigned to a section to which the aging speed gradient of the vehicle 10 belongs.

FIGS. 12 to 19 are diagrams each illustrating an example of a screen for providing a health index service of a vehicle according to an embodiment.

The user terminal 30 may display the health index information transmitted from the vehicle health index providing server 20 on the screen of the user terminal 30 through the application 301.

The application 301 may display the health index of the vehicle 10 in the form of a grade on the screen of the user terminal 30. In addition, the user terminal 30 may provide comparison information with vehicles of the same group on the screen of the user terminal 30 through the application 301.

Figure 12:
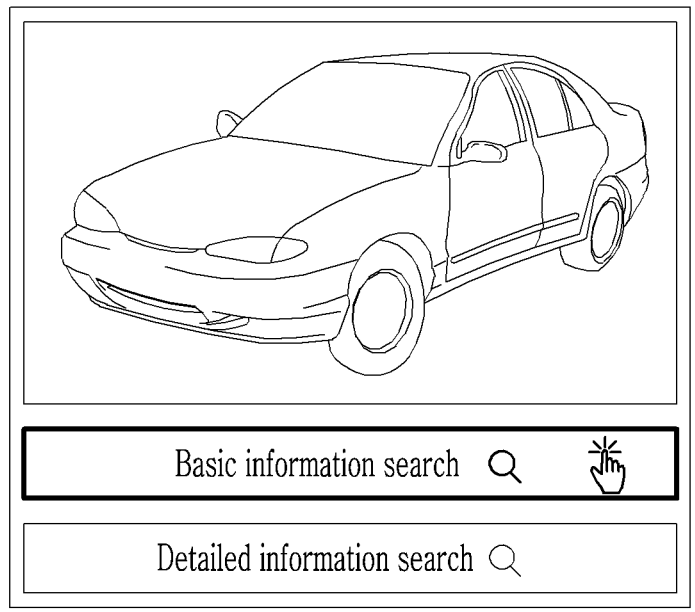
FIGS. 12 to 19 are diagrams each illustrating an example of a screen for providing a health index service of a vehicle according to an embodiment.

Referring to FIG. 12, a user may access the vehicle health index providing server 20 through an application 301.

The user requests a basic information search of the vehicle 10 through the application 301.

The vehicle health index providing server 20 transmits basic information search results including basic information and product information of the vehicle 10 to the user terminal 30.

Figure 13:

As shown in FIG. 13, the user terminal 30 may display the basic information search result received from the vehicle health index providing server 20 on the screen of the user terminal 30 through the application 301.

Figure 14:
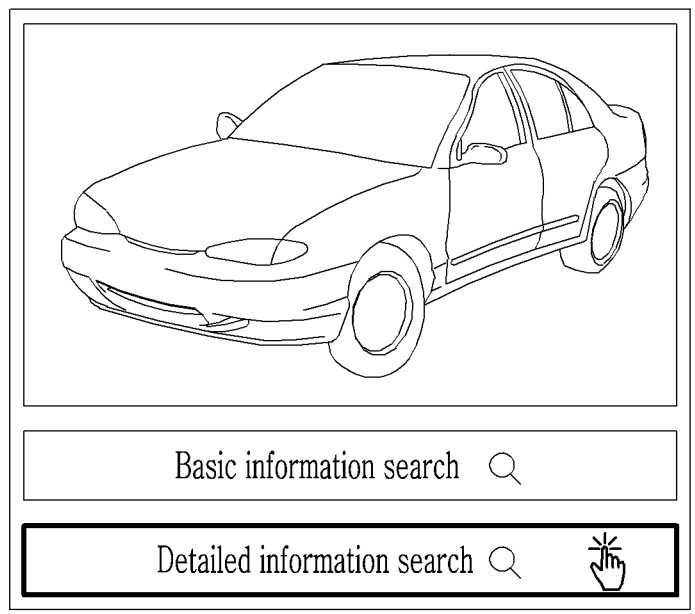

Next, referring to FIG. 14, the user may request a detailed information search of the vehicle 10 through the application 301. The detailed information search request may mean requesting a health index of the vehicle 10.

The vehicle health index providing server 20 transmits a detailed information search result of the vehicle 10 to the user terminal 30. The detailed information search result may include a composite health index of the vehicle 10. The detailed information search result may further include comparison information with vehicles of the same group and an aging speed index of the vehicle 10. In addition, the detailed information search result may further include a detailed item index of the vehicle 10.

The vehicle health index providing server 20 may transmit the composite health index of the vehicle 10 to the user terminal 30 as a detailed information search result.

As shown in FIGS. 15 to 19, the user terminal 30 may display detailed information search results received from the vehicle health index providing server 20 on the screen of the user terminal 30 through the application 301.

As a detailed information search result, additional information may be sequentially displayed on the screen according to the selection of the user terminal 30 from the composite health index of the vehicle 10.

Figure 15:
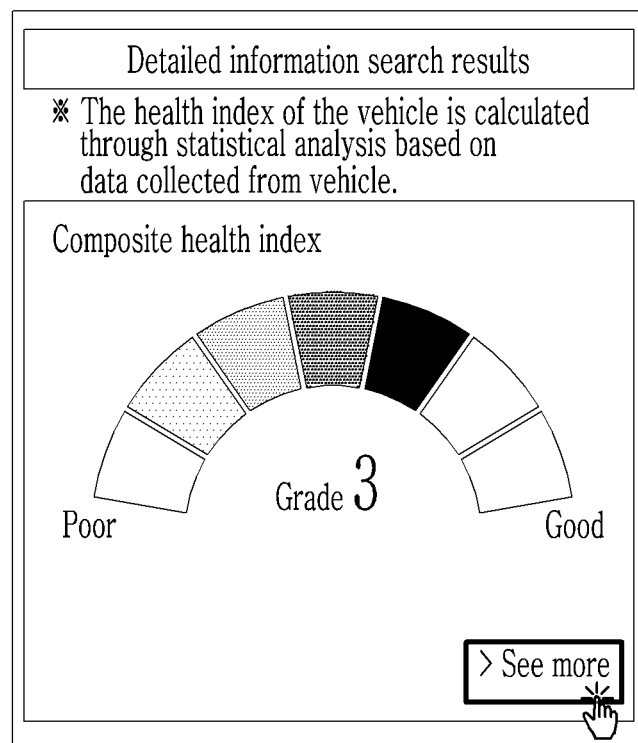

First, as shown in FIG. 15, the user terminal 30 may display the composite health index of the vehicle 10 on the screen of the user terminal 30 through the application 301. The composite health index of the vehicle 10 may be displayed in a grade as described above.

Figure 16:
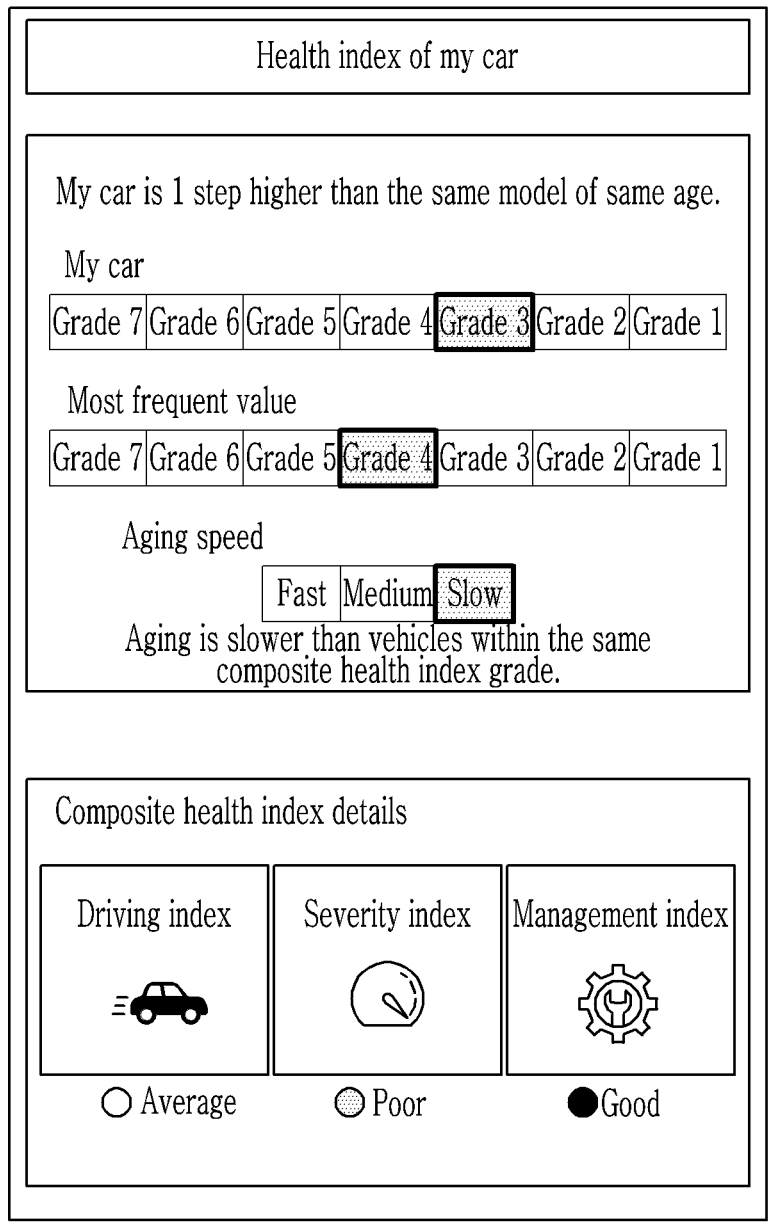

Users can select the "see more" option to see more detailed results. When the user selects the "see more" option through the application 301, the user terminal 30, as shown in FIG. 16, may display comparison information with vehicles of the same group and the aging speed index of the vehicle 10 on the screen of the user terminal 30 through the application 301. In addition, the user terminal 30 may display the driving index, the severity index, and the management index, which are detailed item indices of the vehicle 10, on the screen of the user terminal 30 through the application 301.

In addition, the vehicle health index providing server 20 may provide analysis results for driving index, severity index, and management index.

Figure 17:
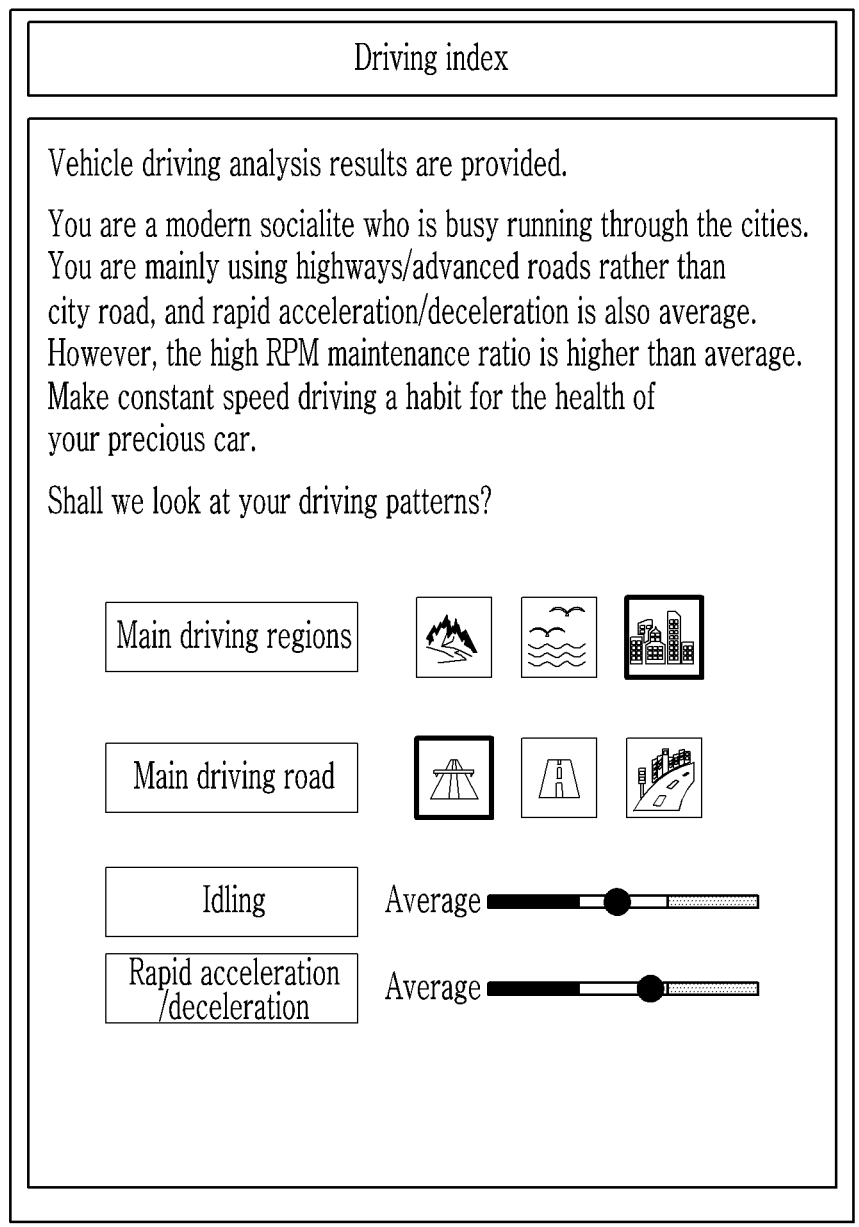

When the user terminal 30 selects a driving index among the driving index, the severity index, and the management index, as shown in FIG. 17, the analysis result of the driving index may be displayed on the screen of the user terminal 30 through the application 301. The analysis result of the driving index may include an analysis result of detailed item information of the driving information.

Figure 18:
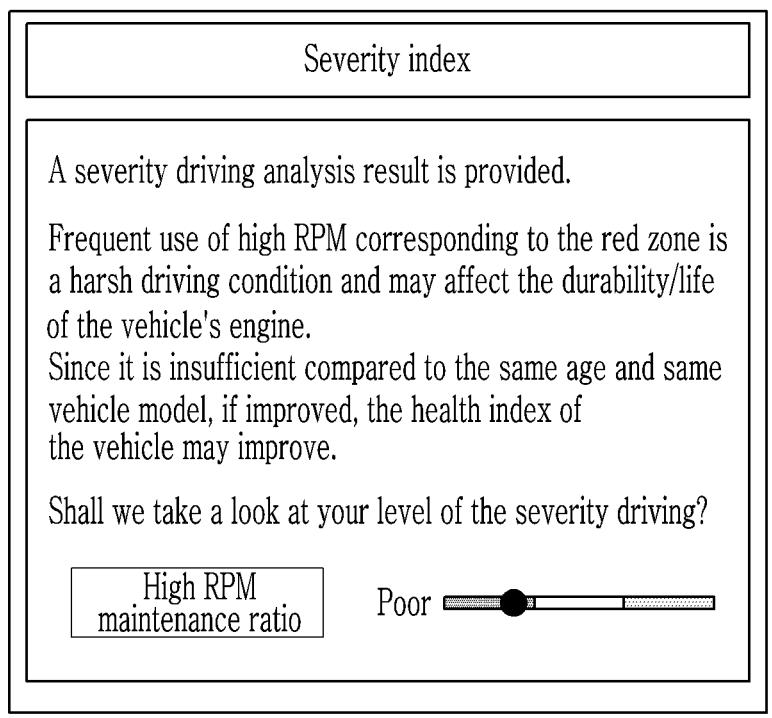

When the user terminal 30 selects a severity index among the driving index, the severity index, and the management index, as shown in FIG. 18, the analysis result of the severity index may be displayed on the screen of the user terminal 30 through the application 301. The analysis result of the severity index may include an analysis result for detailed item information of the severity factor information.

Figure 19:
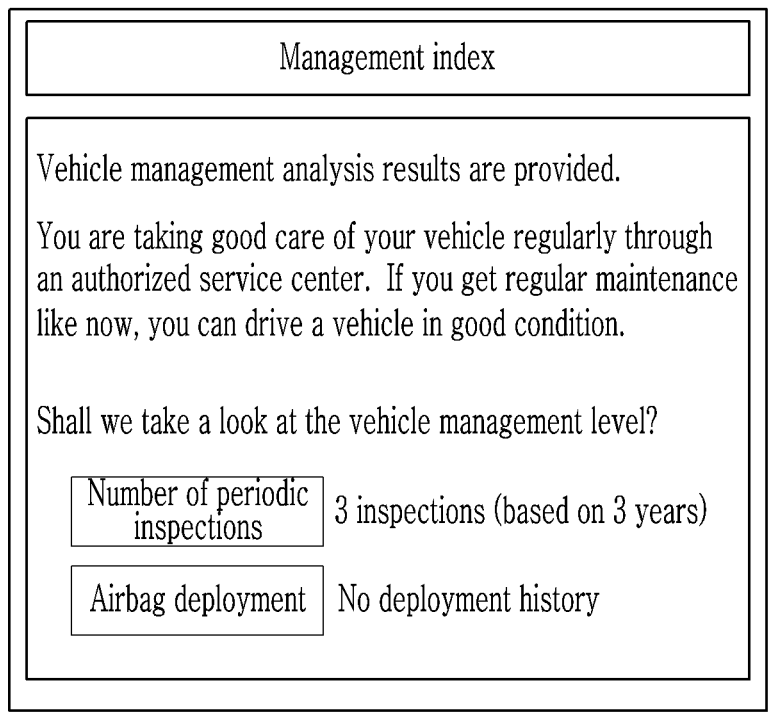

In addition, when the user terminal 30 selects a management index from among the driving index, the severity index, and the management index, as shown in FIG. 19, the analysis result of the management index may be displayed on the screen of the user terminal 30 through the application 301. The analysis result of the management index may include an analysis result for detailed item information of the management information.

Figure 20:
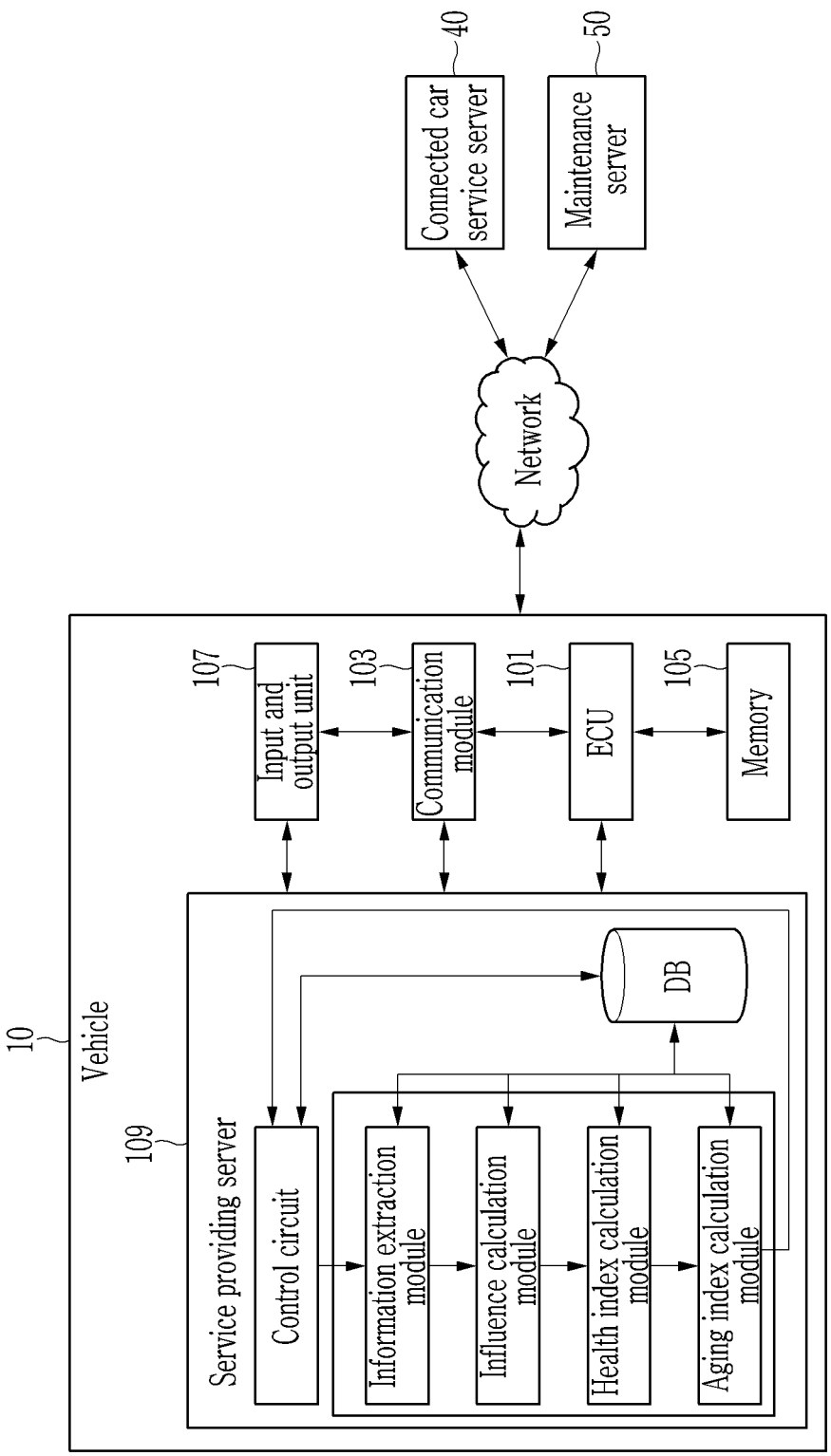
FIG. 20 is a diagram illustrating a configuration of a vehicle according to an embodiment.

FIG. 20 is a diagram illustrating a configuration of a vehicle according to an embodiment.

Referring to FIG. 20, the vehicle 10 includes the ECU 101, the communication module 103, the memory 105, an input and output unit 107, and a service providing apparatus 109.

The service providing apparatus 109 may perform the function of the vehicle health index providing server 20 described above. The service providing apparatus 109 may include modules identical to or similar to those of the vehicle health index providing server 20 shown in FIG. 2. However, since the communication module 103 exists in the vehicle, the communication module 211 of the vehicle health index providing server 20 shown in FIG. 2 may be excluded from the service providing apparatus 109. That is, the vehicle health index service can be provided in the vehicle 10.

The input and output unit 107 may generate input data for controlling an operation of the vehicle 10 and output an audio signal (or signal related to hearing), a video signal (or signal related to sight), an alarm signal, or a signal related to tactile sense. For example, the input and output unit 107 may be a vehicle display installed in the vehicle 10. Alternatively, the vehicle 10 may receive input data from the user terminal 30 through a network and transmit output data of the vehicle 10 to the user terminal 30.

Figure 21:
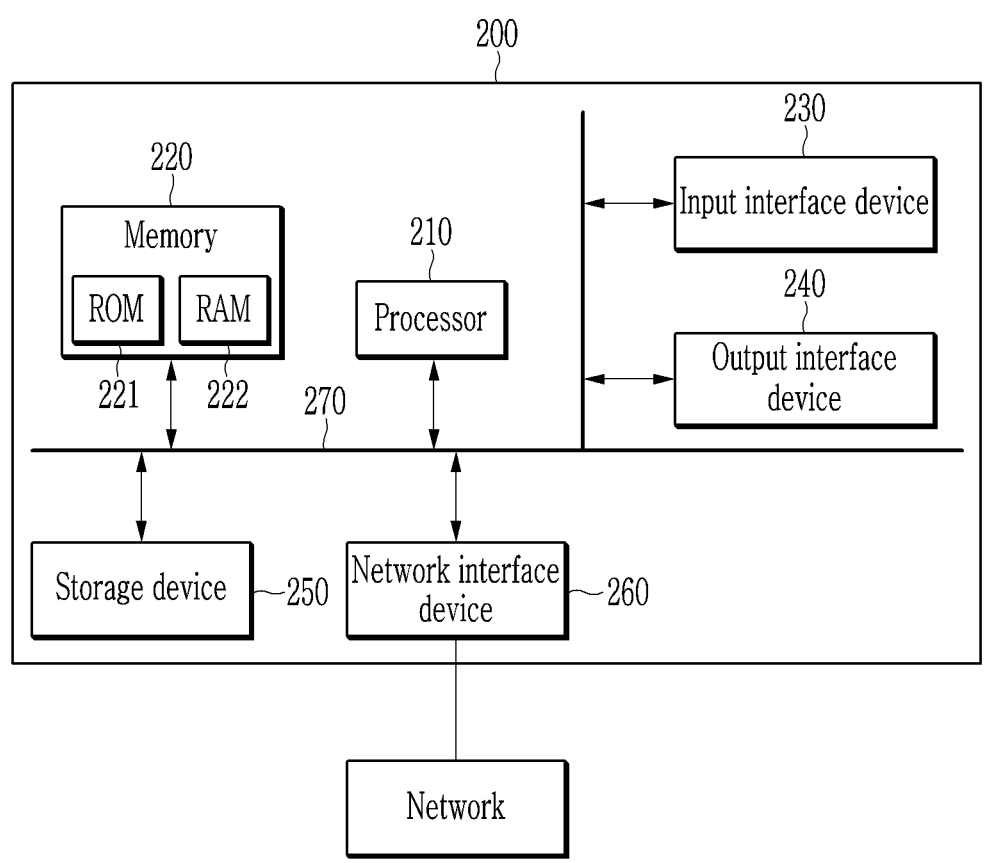
FIG. 21 is a diagram illustrating an apparatus for providing a health index of a vehicle according to another embodiment.

FIG. 21 is a diagram illustrating an apparatus for providing a health index of a vehicle according to another embodiment.

Referring to FIG. 21, the vehicle health index providing device 200 may represent a computing device implementing the method for providing a health index of a vehicle described above. The vehicle health index providing device 200 may refer to the vehicle health index providing server 20 shown in FIG. 1.

The vehicle health index providing device 200 includes at least one of a processor 210, a memory 220, an input interface device 230, an output interface device 240, a storage device (i.e., a memory) 250, and a network interface device 260. Each of the components may be connected by a common bus 270 to communicate with each other. In addition, each of the components may be connected through an individual interface or a separate bus centering on the processor 210 instead of the common bus 270.

The processor 210 may be implemented as various types such as an application processor (AP), a central processing unit (CPU), a graphics processing unit (GPU), etc., and may be any semiconductor device that executes a command stored in the memory 220 or the storage device 250. The processor 210 may execute program commands stored in at least one of the memory 220 and the storage device 250. The processor 210 stores program commands for implementing at least some functions of the control circuit 201, the information extraction module 203, the influence calculation module 205, the health index calculation module 207, and the aging index calculation module 209 described with reference to FIG. 2 in the memory 220 and may control to perform the operation described with reference to FIGS. 1 to 20.

The memory 220 and the storage device 250 may include various types of volatile or non-volatile storage media. For example, the memory 220 may include a read-only memory (ROM) 221 and a random access memory (RAM) 222. The memory 220 may be located inside or outside the processor 210, and the memory 220 may be connected to the processor 210 through various known means. The memory 220 or the storage device 250 may include the database 213 shown in FIG. 2.

The input interface device 230 is configured to provide input data to the processor 210.

The output interface device 240 is configured to output data from the processor 210.

The network interface device 260 may transmit or receive a signal with an external device through a wired network or a wireless network. The network interface device 260 may include the communication module 211 shown in FIG. 2.

At least some of the method for providing a health index of a vehicle according to embodiments of the present disclosure may be implemented as a program or software executed in a computing device, and the program or software may be stored in a computer-readable medium.

In addition, at least some of the method for providing a health index of a vehicle according to embodiments of the present disclosure may be implemented as hardware capable of being electrically connected to the computing device.

Although the embodiments of the present disclosure have been described in detail above, the scope of the present disclosure is not limited thereto, and various modifications and improvements of those skilled in the art using the basic concepts of the present disclosure defined in the following claims are also included in the present disclosure.

What is claimed is:

1. An apparatus for providing a health index of a vehicle, the apparatus comprising:
   a memory installed in a plurality of modules and configured to provide information for calculating the health index of the vehicle;
   a control circuit configured to control the plurality of modules to perform operations for determining the health index of the vehicle by executing program commands on a processor; and
   a database configured to store connected car information of the vehicle and management information of the vehicle,
   wherein the plurality of modules comprises:
      a communication module configured to:
         receive a health index request of the vehicle from a user terminal; and
         transmit a composite health index of the vehicle to the user terminal in response to the health index request;
      an information extraction module configured to extract a plurality of detailed items of driving information and a plurality of detailed items of severity factor information from among the connected car information in response to the health index request;
      an influence calculation module configured to calculate an influence of the driving information using the plurality of detailed items of the driving information, an influence of the severity factor information using the plurality of detailed items of the severity factor information, and an influence of the management information using a plurality of detailed items of the management information; and
      a health index calculation module configured to calculate the composite health index of the vehicle using the influence of the driving information, the influence of the severity factor information, and the influence of the management information,
   wherein:
      the influence calculation module is further configured to:
         calculate an influence of each of the plurality of detailed items of the driving information based on a relative position of a value of each of the plurality of detailed items of the driving information within a set range of a corresponding detailed item, and calculate the influence of the driving information by combining the influences of the plurality of detailed items of the driving information;
         calculate an influence of each of the plurality of detailed items of the severity factor information based on a relative position of a value of each of the plurality of detailed items of the severity factor information within a set range of a corresponding detailed item, and calculate the influence of the severity factor information by combining the influences of the plurality of detailed items of the severity factor information; and
         calculate an influence of each of the plurality of detailed items of the management information based on a relative position of a value of each of the plurality of detailed items of the management information within a set range of a corresponding detailed item, and calculate the influence of the management information by combining the influences of the plurality of detailed items of the management information, and
      the plurality of detailed items of the driving information comprises a driving ratio for each region, a driving ratio for each road, and a rapid acceleration/deceleration ratio.

2. The apparatus of claim 1, wherein:
   the health index calculation module is further configured to provide the composite health index of the vehicle as a grade according to a comparison with other vehicles in a group to which the vehicle belongs, and
   the group is determined according to vehicle model, age, trim, or fuel type.

3. The apparatus of claim 1, wherein the health index calculation module is further configured to:
   calculate a driving index based on the influence of the driving information;
   calculate a severity index based on the influence of the severity factor information;
   calculate a management index using the influence of the management information; and
   calculate the composite health index by combining the driving index, the severity index, and the management index.

4. The apparatus of claim 3, wherein:
   the health index calculation module is further configured to provide each of the driving index, the severity index, and the management index as a grade according to a comparison with other vehicles in a group to which the vehicle belongs, and
   the group is determined according to vehicle model, age, trim, or fuel type.

5. The apparatus of claim 1, wherein the influence calculation module is further configured to:
   calculate the influence of the driving information by applying a weight of the driving information to a value calculated using the influence of each detailed item of the driving information;
   calculate the influence of the severity factor information by applying a weight of the severity factor information to a value calculated using the influence of each detailed item of the severity factor information; and
   calculate the influence of the management information by applying a weight of the management information to a value calculated using the influence of each detailed item of the management information.

6. The apparatus of claim 1, wherein the plurality of detailed items of the severity factor information comprises a high revolution per minute maintenance ratio, a frequency of engine overload, a frequency of transmission overload, a number of engine operations, or a number of transmission operations.

7. The apparatus of claim 1, wherein the plurality of detailed items of the management information comprises a number of periodic inspections or a number of airbag deployments.

8. The apparatus of claim 1, wherein the plurality of modules further comprises an aging index calculation module configured to calculate an aging speed index of the vehicle using the composite health index of the vehicle for a set period of time.

9. The apparatus of claim 8, wherein the aging index calculation module is further configured to provide the aging speed index of the vehicle as a grade according to a comparison with other vehicles in a group to which the vehicle belongs.

10. The apparatus of claim 9, wherein the aging index calculation module is further configured to:
calculate a moving average value per unit period for each vehicle using the composite health index of each vehicle in the group to which the vehicle belongs during the set period of time;
calculate an aging speed gradient of each vehicle in the group using the moving average value calculated per unit period for each vehicle; and
calculate the aging speed index of the vehicle by comparing the aging speed gradient of the vehicle with the aging speed gradient of other vehicles in the group to which the vehicle belongs.

11. A method for providing a health index of a vehicle by a processor according to a program command stored in a memory, the method comprising:
receiving a health index request of the vehicle from a user terminal;
receiving connected car information of the vehicle;
receiving management information of the vehicle;
calculating an influence of the connected car information and an influence of the management information;
calculating a composite health index of the vehicle by using the influence of the connected car information and the influence of the management information; and
providing the composite health index of the vehicle to the user terminal,
wherein calculating the influence of the connected car information and the influence of the management information comprises:
extracting a plurality of detailed items of driving information and a plurality of detailed items of severity factor information from among the connected car information in response to the health index request;
calculating an influence of each of the plurality of detailed items of the driving information based on a relative position of a value of each of the plurality of detailed items of the driving information within a set range of a corresponding detailed item;
calculating an influence of the driving information by combining the influences of the plurality of detailed items of the driving information;
calculating an influence of each of the plurality of detailed items of the severity factor information based on a relative position of a value of each of the plurality of detailed items of the severity factor information within a set range of a corresponding detailed item;
calculating an influence of the severity factor information by combining the influences of the plurality of detailed items of the severity factor information;
calculating an influence of each of the plurality of detailed items of the management information based on a relative position of a value of each of the plurality of detailed items of the management information within a set range of a corresponding detailed item; and
calculating the influence of the management information by combining the influences of the plurality of detailed items of the management information, and
wherein the plurality of detailed items of the driving information includes a driving ratio for each region, a driving ratio for each road, and a rapid acceleration/deceleration ratio.

12. The method of claim 11, wherein:
calculating the composite health index of the vehicle comprises providing the composite health index of the vehicle as a grade according to a comparison with other vehicles in a group to which the vehicle belongs, and
the group is determined according to vehicle model, age, trim, or fuel type.

13. The method of claim 11, wherein:
calculating the influence of the driving information comprises:
calculating the influence of the driving information by applying a weight of the driving information to a value calculated using an influence of each detailed item of the driving information;
calculating the influence of the severity factor information comprises:
calculating the influence of the severity factor information by applying a weight of the severity factor information to a value calculated using an influence of each detailed item of the severity factor information; and
calculating the influence of the management information comprises:
calculating the influence of the management information by applying a weight of the management information to a value calculated using an influence of each detailed item of the management information.

14. The method of claim 11, wherein calculating the composite health index of the vehicle comprises:
calculating a driving index based on the influence of the driving information;
calculating a severity index based on the influence of the severity factor information;
calculating a management index using the influence of the management information; and
calculating the composite health index by combining the driving index, the severity index, and the management index.

15. The method of claim 14, wherein:
calculating the composite health index of the vehicle further comprises providing each of the driving index, the severity index, and the management index as a grade according to a comparison with other vehicles in a group to which the vehicle belongs, and
the group is determined according to vehicle model, age, trim, or fuel type.

16. The method of claim 11, further comprising:
calculating an aging speed index of the vehicle using the composite health index of the vehicle for a set period of time; and
providing the aging speed index of the vehicle to the user terminal.

17. The method of claim 16, wherein calculating the aging speed index of the vehicle comprises outputting the aging speed index of the vehicle as a grade according to a comparison with other vehicles in a group to which the vehicle belongs.

18. A vehicle comprising:
a database configured to store connected car information of the vehicle and management information of the vehicle; and
a processor configured to execute program commands,
wherein the processor, by executing the program commands:
extracts driving information and severity factor information from among the connected car information stored in the database;
calculates an influence of the driving information, an influence of the severity factor information, and an influence of the management information; and
calculates a composite health index of the vehicle using the influence of the driving information, the influence of the severity factor information, and the influence of the management information, and
the driving information includes a driving ratio for each region, a driving ratio for each road, and a rapid acceleration/deceleration ratio.

19. The vehicle of claim 18, wherein the processor, by executing the program commands, calculates an aging speed index of the vehicle using the composite health index of the vehicle for a set period of time.

* * * * *